UNITED STATES PATENT OFFICE 2,383,130

SULPHOPOLYCARBOXYLIC ACID MONO-
AMIDES AND THEIR PREPARATION

Alphons O. Jaeger, Greenwich, and Kathryn L.
Lynch, Stamford, Conn., assignors to American
Cyanamid Company, New York, N. Y., a corporation of Maine No Drawing. Application February 7, 1942,
Serial No. 429,946

10 Claims. (Cl. 260—513)

This invention relates to new compounds which have wetting, dispersing, detergent, sudsing and other useful properties. The invention includes the compounds themselves, their methods of preparation, and wetting, emulsifying, demulsifying and detergent compositions containing them.

The compounds of the present invention, the preparation of which will be presently described, are monoamides of aliphatic sulphopolycarboxylic acids of the general formula

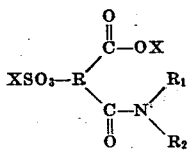

in which R is the residue of an aliphatic polycarboxylic acid, $R_1$ is a member of the group consisting of hydrogen, alkyl, alkoxyalkyl, cyanalkyl, hydroxyalkyl, aminoalkyl, aminoaryl, aryl, alkaryl, arylalkyl, aryloxyalkyl, and cycloalkyl radicals, $R_2$ is a member of the group consisting of alkyl, alkoxyalkyl, cyanalkyl, hydroxyalkyl, aminoalkyl, aminoaryl, aryl, alkaryl, arylalkyl, aryloxyalkyl, and cycloalkyl radicals, and X is a member of the group consisting of hydrogen and salt-forming radicals.

The preferred method of preparing our new compounds comprises the steps of reacting a primary or secondary amine with an anhydride of an unsaturated aliphatic polycarboxylic acid and sulphonating the resulting monoamide by treatment with an alkaline sulphite.

This reaction may be illustrated with maleic anhydride and a secondary amine as follows:

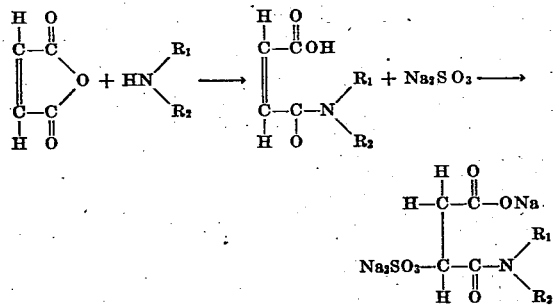

The condensation reaction illustrated is exothermic in character and proceeds easily to substantial completion in a short period of time. With some of the more reactive amines it may be desirable to add the amine slowly to the polycarboxylic acid anhydride to keep the temperature of the reaction mixture at a reasonably low level. Ordinarily we prefer to carry out the reaction at comparatively low temperatures, as for example, from room temperature up to about 85–95° C. Higher temperatures up to about 130° C. may be employed but the reaction mixture should not be held long at such high levels because of the danger of decomposing part of the reaction product to undesirable substances.

Since, for convenience of handling, it is desirable to keep the reaction mixture in a liquid condition the temperature of the mixture may be allowed to rise and may then be held above its melting point during the reaction. One of the reactants may be initially heated to a liquid condition and kept liquid by the continued addition of the other reactant or by external heating. The reaction mixture may also be kept liquid and at a lower temperature by the use of an inert solvent such as $CCl_4$, $CHCl_3$, acetone, tertiary butanol, etc.

Ordinarily we employ substantially equimolecular proportions of amine and acid anhydride or, if desired, a slight excess of the acid anhydride. When an excess of amine is employed it will be found that a monoamide salt is obtained, having the general formula

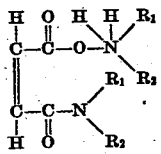

In some cases, however, it may be desirable to form mixed salts and we may do this by sulphonating such monoamide-amide salts of aliphatic polycarboxylic acids with a suitable bisulfite.

Among the various unsaturated aliphatic polycarboxylic acid anhydrides which may be employed in our preferred method may be mentioned maleic anhydride, methyl maleic (citraconic) anhydride, and other alkyl and aryl substituted maleic anhydrides; itaconic, ethyl itaconic, and isopropyl itaconic anhydrides; glutaconic anhydride; muconic anhydride; aconitic anhydrides; etc.

Although we prefer to prepare our new compounds in the manner outlined above and described in detail in the specific examples they may be prepared by other methods. We may, for example, start with the anhydride of a sulphonated aliphatic polycarboxylic acid such as sulphosuccinic, sulphomethyl succinic, sulphodimethyl succinic, sulphoisopropyl succinic, sulphophenylsuccinic, sulphoglutaric, sulphomethylglutaric, sulphooctylglutaric, sulphopimelic, sulphosuberic, sulphosebacic, sulphotricarballylic, and the like. These anhydrides of sulphopolycarboxylic acids are reacted with equimolecular proportions of primary or secondary amines as described hereinafter to form acid monoamides, for example sulphosuccinamic acid, which may then be neutralized with any desired salt-forming base to yield the compounds of the present invention.

Another distinct method of preparing our new compounds comprises the steps of reacting one mole of an alcohol with one mole of one of the sulphoaliphatic polycarboxylic acids of the class described above to obtain the monoester of the sulpho acid employed. This monoester may then be reacted with a primary or secondary amine to yield a mixed ester-amide or aminic acid ester. The mixed ester-amide may then be heated with an alkali to split off the ester group leaving the sulphoaliphatic polycarboxylic acid monoamide salt of our invention.

A modification of this latter method employs the unsulphonated unsaturated polycarboxylic acids described earlier and follows the general steps of forming the monoester, reacting it with a primary or secondary amine to form the monoamide-monoester, splitting off the ester group by heating with alkali, and sulphonation of the monoamide salt with a sulphite or bisulphite as previously described.

Still another method of preparing our new compounds comprises the steps of heating a sulphoaliphatic polycarboxylic acid ester with one of the primary or secondary amines to be presently described in the presence of free alkali. The ester groups may be split off and the resulting alcohol removed by volatilization leaving the corresponding polycarboxylic acid monoamide alkali salt.

Our compounds may also be prepared by reacting an unsaturated aliphatic polycarboxylic acid with a primary amine to form an imide of the particular amine and polycarboxylic acid employed. The imide may then be heated with an alkali whereby a monoamide polycarboxylic acid alkali salt is obtained. This product may then be sulphonated to yield the new compounds of the present invention.

Instead of sulphonating the compounds of the present invention with alkaline sulphites we may neutralize the free carboxylic acid group with an alkali and then sulphonate by treatment with an alkaline bisulphite. A still further method of sulphonating the polycarboxylic acid monoamides described above involves treatment with $SO_2$ and free alkali in the presence of water.

Although our compounds may be prepared by these various methods described above, and also by modifications thereof which will occur to those skilled in the art, we prefer the method first described and utilized in the specific examples since this method is easily carried out with readily obtainable raw materials and with a minimum of manipulative steps. Our preferred method requires no complicated apparatus and yields a product of excellent purity in practically quantitative yields. For certain purposes, however, where a very pure product is not necessary, or where the presence of small quantities of diesters, the ester-amides, diamides, or imides is not objectionable in the product, or in cases where the raw materials are particularly cheap, one of the alternative methods described above may be employed to good advantage in the preparation of our new compounds.

A very large number of primary and secondary mono- and polyamines such as alkyl, aryl, alkylaryl or cycloaliphatic amines of various types may be employed in the preparation of our new compounds. Substituent radicals such as —CN, —OH, —SH, —S—, —O—,

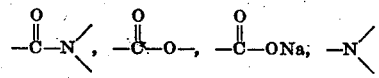

etc., may interrupt or terminate groups attached to the amino nitrogen of the primary or secondary amine. In other words, the amines which may be employed may be represented by the general formula

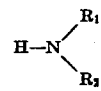

in which $R_1$ is an alkyl, alkoxyalkyl, cyanalkyl, hydroxyalkyl, aminoalkyl, aminoaryl, aryl, alkaryl, aryloxyalkyl, cycloalkyl or similar radicals and $R_2$ is a radical of the same type when the amine is a secondary amine but becomes hydrogen when the amine is a primary amine.

For purposes of illustration, specific examples of these primary and secondary amines are given below but it should be clearly understood that our invention is not limited to those specifically mentioned since, obviously, it is not feasible to mention all possible primary and secondary amines falling within the scope of our invention as described herein. Primary amines which may be used have the general formula

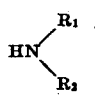

in which $R_1$ may be hydrogen and $R_2$ may be one of the following radicals:

Butyl 

Amyl 

n-Octyl 

Ethyl hexyl 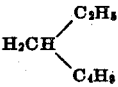

Dodecyl 

Tetradecyl 

Hexadecyl 

Octadecyl 

Methyl hexoxypropyl 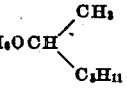

Ethyl hexoxypropyl 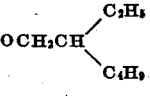

Butoxypropyl 

Amoxypropyl 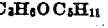

Caproxypropyl $$-C_3H_6OCH\begin{matrix}CH_3\\C_6H_{13}\end{matrix}$$

1-methyl-4-ethylhexoxypropyl $$-C_3H_6O-CH(CH_3)-CH_2CH_2CH\begin{matrix}C_2H_5\\C_2H_5\end{matrix}$$

Diisobutyl methoxypropyl $$-C_3H_6O-CH\left[CH_2CH\begin{matrix}CH_3\\CH_3\end{matrix}\right]_2$$

Undecoxypropyl $$-C_3H_6O-CH(CH_3)-CH_2CH_2CH\begin{matrix}C_2H_5\\C_4H_9\end{matrix}$$

Dodecoxypropyl $$-C_3H_6OC_{12}H_{25}$$

Tetradecoxypropyl $$-C_3H_6OCH\begin{matrix}CH_2CH(CH_3)_2\\CH_2CH_2CH(C_2H_5)(C_4H_9)\end{matrix}$$

Hexadecoxypropyl $$-C_3H_6O-C_{16}H_{33}$$

Heptadecoxypropyl $$-C_3H_6O-CH\begin{matrix}CH_2CH_2CH(C_2H_5)_2\\CH_2CH_2CH(C_2H_5)(C_4H_9)\end{matrix}$$

Octadecoxypropyl $$-C_3H_6OC_{18}H_{37}$$

Cyanethyl $$-C_2H_4CN$$

Hydroxyethyl $$-C_2H_4OH$$

Dodecylaminopropyl $$-C_3H_6NHC_{12}H_{25}$$

Secondary amines may be employed in which $R_1$ and $R_2$ are the same or different radicals such as those illustrated above.

We may also employ aromatic, hydroaromatic, saturated and unsaturated cycloaliphatic amines such as alkyl anilines $$H-NH-C_6H_4-C_8H_{17}$$

N-alkyl anilines such as $$H-N(C_8H_{17})-C_6H_5$$

Phenylene diamines $$H-NH-C_6H_4-N(C_4H_9)_2$$

Naphthylamines $$H-NH-C_{10}H_7$$

Benzylamines $$H-NH-CH_2-C_6H_5$$

Diphenylamines $$(C_6H_5)_2NH$$

Cyclohexylamines $$H_2N-C_6H_{11}$$

and fatty acid esters or amido-amines such as $$H-NHCH_2CH_2NH\overset{O}{\underset{\|}{C}}-C_{11}H_{23}$$

and $$H-NHCH_2CH_2O-\overset{O}{\underset{\|}{C}}-C_{11}H_{23}$$

and the like.

Although we have named a large number of representative primary and secondary alkyl, aryl, alkaryl and cycloalkyl amines, any one or more of these may be reacted with any of the unsaturated polycarboxylic acid anhydrides or sulphoaliphatic carboxylic acid anhydrides mentioned above under the conditions described to obtain the corresponding monoamides which, unless already sulphonated as when using a sulpho-compound, may then be sulphonated to prepare the compounds of the present invention.

In most of the specific examples which follow we have employed sodium as the salt-forming radical since sodium sulphite and bisulphite are relatively cheap, easily handled and conveniently obtained. For most purposes our new compounds are of greatest importance in the form of their sodium salts. However, for special purposes we may prefer to use our compounds in the form of the free acid-monoamide in which case X in the general formula $$XSO_2-R\begin{matrix}C-OX\\\|\\O\end{matrix}\begin{matrix}R_1\\C-N\\\|\\O\end{matrix}R_2$$

may be hydrogen. We prefer, however, to prepare our compounds in the form of their salts in which X in the general formula may be a salt-forming radical such as Na, K, Li, NH₄, Ba, Ca, Zn, Cu, Hg, Cd, Mg, etc., or a radical of an amine such as ethanolamine, morpholine, guanidine, pyridine, or other hydrophilic salt-forming radical. In order to introduce these radicals into our new compounds it is not necessary to use them in the form of sulphites or bisulphites since, if desired, we may prepare the free sulphonic acid polycarboxylic acid monoamide and neutralize it with a suitable salt-forming base such as one of the class named. Mixed salts in which the X's in the above formula are different salt-forming radicals may also be prepared as previously indicated.

The preparation of the compounds of our invention will now be described in greater particularity in the following specific examples to which, however, our invention is not limited since these examples are given for purposes of illustration and the invention in its broader aspects is to be limited only by the scope of the appended claims.

Example 1

Dodecyl di-sodium sulphosuccinamate 40 g. of maleic anhydride was dissolved in 100 ml. chloroform and 150 ml. of carbon tetrachloride and 97 g. of a commercial grade of dodecyl amine containing 95% $C_{12}H_{25}NH_2$ was added slowly to the maleic anhydride solution with cooling to keep the temperature between 30 and 35° C. On standing for a short time at this temperature, the mixture set to a stiff gel which melted on warming. The solvents were removed by distillation under reduced pressure and the product, N-dodecyl maleiamic acid, recrystallized from ethyl acetate in the form of a white fluffy powder insoluble in water and having a melting point of 87° C.

29.3 g. of the crystalline N-dodecyl maleiamic acid was dissolved in 150 ml. hot water containing 12.6 g. of sodium sulphite. After warming at 75° C. to 80° C. for one-half hour, the clear aqueous solution was poured into twice its volume of ethyl alcohol. A white fatty product was precipitated and recovered by decantation of the aqueous alcohol. The residue was washed with fresh alcohol and finally dried to a white-water-soluble hard wax which chemical analysis proved to be dodecyl di-sodium sulphosuccinamate of 95% purity.

A second batch of dodecyl di-sodium sulphosuccinamate was prepared as described above using tertiary butanol as solvent in place of the chloroform-carbon tetrachloride mixture.

Example 2

Dodecyl di-sodium sulphosuccinamate 18.7 g. of dodecyl amine of 98.8% purity was added slowly to 9.8 g. of maleic anhydride dissolved in 70 ml. of chloroform keeping the temperature between 35 and 50° C. by cooling. Upon cooling the solution below 30° C. dodecyl maleiamic acid crystallized out and was removed by filtering. This amide was sulphonated by dissolving it in 100 ml. of water containing 13 g. of sodium sulphite keeping the temperature at 90° C. for one hour. Water was evaporated off leaving 42 g. of a pure white soapy solid which upon chemical analysis was found to be dodecyl disodium sulphosuccinamate of 97% purity.

Example 3

Dodecyl di-sodium sulphosuccinamate 225 g. of a commercial sample of dodecyl amine was added over a period of one hour to 100 g. of maleic anhydride at 61° to 73° C. without external cooling. After all the amine had been added the mixture began to freeze and it was necessary to heat it to 80° C. to keep it liquid. 132 g. of sodium sulphite was dissolved in 750 ml. of hot water and added to the molten amide. The solution was heated on a steam bath for 45 minutes and evaporated to dryness. The dried product was ground in a mortar and extracted with three 600 ml. portions of hot ethyl alcohol. After drying, 400 g. of 88% dodecyl disodium sulphosuccinamate was obtained as a white powder.

The dodecyl disodium sulphosuccinamate samples prepared in each of the above described examples were, when ground to a powder, of a white to cream color depending upon the purity of the dodecyl amine employed in their preparation. These products had a slightly soapy odor and a slightly bitter taste. They were very soluble in water, 20% at 30° C. and showed good wetting power when measured by the Draves test. They showed excellent foaming characteristics, both in volume of foam and foam stability. Their detergency in soft water was very good and in hard water containing 300 P. P. M. of $CaCO_3$ their detergency was materially better than soap. Their dispersing power and soapiness characteristics were also excellent.

Dodecyl disodium sulphosuccinamate is also acid and alkali stable in dilute aqueous solution. A 0.1% solution of the compound after having been heated to 80° C. for 8 hours with 2½% $H_2SO_4$ based on the total weight of the solution, showed practically no change in wetting strength. A 0.1% solution of the compound heated for 8 hours at 80° C. with a 1% NaOH solution also showed practically no change in wetting strength.

Example 4

Lauryl disodium sulphosuccinamate 36 g. of primary laurylamine was added to 20 g. of maleic anhydride dissolved in 150 ml. of acetone at room temperature. The reaction mixture was then neutralized to a pH of 7.0 with a 45% solution of NaOH and the mixture evaporated to dryness to remove the acetone. The product was then stirred into a warm aqueous solution containing 50% alcohol and $NaHSO_3$. After heating for two hours 90% of the theoretical quantity of $NaHSO_3$ had been consumed and the solution was again evaporated to dryness. The lauryl disodium sulphosuccinamate was then ground to a white powder easily soluble in water.

Example 5

Tetradecyl disodium sulphosuccinamate

Tetradecyl disodium sulphosuccinamate was prepared using the general procedure described in Example 3 employing a commercial grade (88.5%) of tetradecyl amine, $C_{14}H_{29}NH_2$. The product was a white powder having a sweet odor and a bitter taste. It was fairly soluble in water, a 10% solution being slightly turbid at 30° C. This compound was a more powerful wetting agent than the dodecyl disodium sulphosuccinamate previously described but was not quite so good a detergent and dispersing agent.

Example 6

Octadecyl disodium sulphosuccinamate

Octadecyl disodium sulphosuccinamate was also prepared by the method described in Example 3 using octadecyl amine, $C_{18}H_{37}NH_2$. The product was a yellow waxy powder having a mildly soapy odor and taste. The product had excellent detergent and dispersing properties and its solutions had excellent sudsing properties giving a copious and stable foam. In hard water, 300 parts per million $CaCO_3$, its detergent power was approximately three times that of soap in concentrations of the order of 0.25%. Its wetting power as measured by the Draves test was not particularly good at room temperatures but at elevated temperatures it was excellent.

Example 7

Undecoxypropyl disodium sulphosuccinamate 25.1 g. of N-1-methyl-4-ethyl octoxypropyl (undecoxypropyl) amine

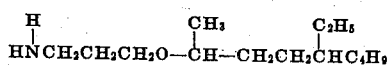

was added slowly with cooling and stirring to a solution of 9.8 g. of maleic anhydride dissolved in 50 ml. of CHCl₃ keeping the temperature below 40° C. The undecoxypropyl maleiamic acid resulting from the reaction was recovered by distillation of the solvent under reduced pressure. This product was sulphonated by dissolving it in 100 ml. of hot water containing 13 g. of Na₂SO₃ and keeping the temperature at 85° C. for one hour. Upon evaporating the water, 45 g. of a cream colored soapy solid was obtained which dissolved readily in cold water to give clear, foaming solutions having a pH of 6.2. The product, without subsequent purification was analyzed and found to be undecoxypropyl disodium sulphosuccinamate of 94.5% purity.

EXAMPLE 8

*Dodecoxypropyl disodium sulphosuccinamate*

Several lots of the above compound were prepared by each of the methods described in Examples 6 and 3 by reacting substantially equimolecular proportions of dodecoxypropyl amine, H₂N(CH₂)₃OC₁₂H₂₅ and maleic anhydride. The product was a cream colored powder having a slightly acrid but pleasing odor and a bitter taste. It was very soluble in water, a 25% solution at 30° C. being clear. It was a good wetting agent and had excellent dispersing, foaming, and detergent properties. It was also found to have a high calcium tolerance, a 2½% solution tolerating 670 parts per million of CaCO₃ at 30° C. It also maintained good wetting power in dilute solutions of electrolytes such as 1% HCl, 5% NaOH, 5%Na₂SO₄, etc. Its wetting power at elevated temperatures was also good showing at a concentration of 0.1% a Draves sinking time of 37 seconds at 30° C., 23.6 seconds at 50° C., and 16.5 seconds at 70° C. 0.1% solutions of the dodecoxypropyl disodium sulphosuccinamate were also stable to acids and alkalies showing practically no change in wetting power after being heated in a 1% solution of NaOH and a 2½% solution of H₂SO₄ for 8 hours at 80° C.

EXAMPLE 9

*Tetradecoxypropyl disodium sulphosuccinamate*

Tetradecoxypropyl disodium sulphosuccinamate was prepared by reacting equimolecular proportions of tetradecoxypropyl amine with maleic anhydride dissolved in chloroform followed by removal of the solvent under reduced pressure and sulphonation of the product with aqueous Na₂SO₃ solution. A pale yellow solid which was easily ground to a white soap-like powder was obtained. The product had a slightly soapy odor and bitter taste and was easily dissolved in water to give clear foaming solutions having a pH of 6.5.

EXAMPLE 10

*Hexadecoxypropyl disodium sulphosuccinamate*

Hexadecoxypropyl disodium sulphosuccinamate was prepared from primary hexadecoxypropyl amine as described by the method outlined in Example 9. The product was a hard, white, water-soluble, wax-like material. Its dispersing and detergent properties were excellent and a 2% solution had a calcium tolerance of 780 P.P.M. of CaCO₃.

EXAMPLE 11

*Octadecoxypropyl disodium sulphosuccinamate*

Octadecoxypropyl disodium sulphosuccinamate was prepared by reacting primary octadecoxypropyl amine and maleic anhydride at 80° C. followed by sulphonation with an aqueous Na₂SO₃ solution containing about 25% of ethyl alcohol. On evaporation of the solvents, a hard, white, water-soluble, wax-like product was obtained which possessed excellent dispersing and detergent properties. The product had a very good calcium tolerance and in hard water, 300 P.P.M. CaCO₃, had a detergency approximately 3 times that of soap.

EXAMPLE 12

*Dodecyl 2-hydroxyethyl disodium sulphosuccinamate*

36.5 g. of 2-hydroxyethyl dodecyl amine, C₁₂H₂₅NHCH₂CH₂OH, was melted and added slowly to 9.8 g. of maleic anhydride. After the reaction had subsided, the product was poured into 100 ml. of hot water containing 25 ml. of alcohol and 13 g of Na₂SO₃. The reaction mixture was heated on a steam bath for one hour to complete the sulphonation. Upon evaporation of the solvents, 56 g. of a cream colored, soap-like solid was obtained. This material was readily soluble in water to give clear foaming solutions having a pH of 7.5.

EXAMPLE 13

*Dodecyl 2-cyanethyl disodium sulphosuccinamate*

20 g. of dodecyl amino propionitrile, C₁₂H₂₅NHCH₂CH₂CN was reacted with 7.1 g. of maleic anhydride at 70° C. and the product sulphonated by dissolving it in 90 ml. of hot water containing 9.5 g. of Na₂SO₃. After 1½ hours on the steam bath, the sulphonation was complete and 35 g. of a cream colored, soapy powder was obtained by evaporating the water. The product was readily soluble in cold water to give clear foaming solutions having a pH of 6.2. The sudsing properties of aqueous solutions of the compound were excellent both as to volume of foam and foam stability. The stability of this compound in acid and alkali solutions was found to be excellent. A 0.1% solution of the wetting agent in 1% NaOH showed practically no decrease in wetting power after heating for 8 hours at 80° C. 0.1% solution of the product in a 2½% H₂SO₄ solution, after heating at 80° C. for 8 hours, showed an increase in the wetting time as measured by the Draves test of only 10 seconds.

EXAMPLE 14

*Tetradecyl 2-cyanethyl disodium sulphosuccinamate*

5.3 g. of acrylonitrile was added to 24 g. of tetradecyl amine at 60° C. and held at that temperature for 15 minutes before adding 9.8 g. of maleic anhydride. The temperature of the reaction mixture rose to 95° C. and when the reaction had subsided, the crude maleiamic acid derivative was poured into a solution of 13 g. of Na₂SO₃ dissolved in 100 ml. of hot water. After 1½ hours on a steam bath, the sulphonation was substantially complete and the water evaporated. 48 g. of a soapy white solid was obtained which gave clear foaming solutions having a pH of 8.0.

EXAMPLE 15

*Octadecyl 2-cyanethyl disodium sulphosuccinamate*

Octadecyl 2-cyanethyl disodium sulphosuccinamate was prepared by the method described in the preceding example but employing octadecyl amine. The product was a tan colored waxy solid having a soapy odor and taste and being readily soluble in water to give clear foaming solutions having a pH of 7.5

EXAMPLE 16

*Di-2-ethylhexyl disodium sulphosuccinamate*

30.8 g. of di-2-ethylhexyl amine was added to 9.8 g. of maleic anhydride with a spontaneous rise of temperature to a maximum of 65° C. Sulphonation with $Na_2SO_3$ was carried out in the usual way and a hard, cream colored solid obtained. This product dissolved easily in water to give slightly turbid, weakly foaming solutions having a pH of 6.5.

EXAMPLE 17

*2-ethylhexoxypropyl disodium sulphosuccinamate*

20 g. of primary 2-ethylhexoxypropyl amine was added to 9.8 g. of maleic anhydride during which time the temperature rose to 115° C. Sulphonation was accomplished by dissolving the compound in 100 ml. of hot water containing 13 g. of $Na_2SO_3$. After evaporation of the water 43 g. of a white solid was obtained which was readily soluble in water to give clear foaming solutions having a pH of 6.5. This product had excellent dispersing power but was not particularly powerful as a sudsing agent. A 5% caustic alkali solution containing 0.1% of this product based on the total weight of the solution was heated for 8 hours at 80° C., after which time its wetting power had decreased only slightly. A 0.1% solution of the 2-ethylhexoxypropyl disodium sulphosuccinamate in a 10% solution of $H_2SO_4$ was heated for 8 hours at 80° C. and found to have retained good wetting power.

EXAMPLE 18

*Di-2-ethylhexoxy disodium sulphosuccinamate*

38 g. of secondary 2-ethylhexoxypropyl amine was added to 9.8 g. of maleic anhydride dissolved in 100 ml. of chloroform, keeping the temperature between 20–30° C. by cooling. The chloroform was evaporated under reduced pressure and the residue of maleiamic acid derivative was added to 13 g. of $Na_2SO_3$ in 100 ml. of water and 50 ml. of ethyl alcohol. After heating for one hour the sulphonation was complete and the solvents were evaporated. 58 g. of a light yellow, waxy solid was obtained which dissolved in water giving very slightly turbid solutions having a pH of 7.0. This product had good dispersing properties and excellent detergent power. It was also an excellent wetting agent, being far superior to the 2-ethylhexoxypropyl disodium sulphosuccinamate described in the preceding example. In 0.0125% aqueous solution it had a wetting time, as measured by the Draves test, of 80 seconds at 30° C., 54 seconds at 50° C., and 50 seconds at 70° C. In 2½% and 5% solutions of $Na_2SO_4$ and in hard water of 400 P. P. M. $CaCO_3$, the wetting agent was still completely soluble and highly effective. It also proved to be extremely stable when heated in a 1% solution of NaOH at 80° C. for 8 hours, and in a 2½% solution of $H_2SO_4$ heated at 80° C. for 8 hours it did not lose its powerful wetting properties.

EXAMPLE 19

*Di-caproxypropyl disodium sulphosuccinamate*

37.5 g. of dicaproxypropyl amine was added to 9.8 g. of maleic anhydride with a temperature rise to 85° C. After sulphonating with $Na_2SO_3$ and drying a pure white, water soluble, wax-like material was obtained which gave clear solutions having a pH of 6.5. The product had a slightly acrid but pleasing odor and a bitter after taste. It had very good wetting properties even in hard water containing 400 parts per million of $CaCO_3$.

EXAMPLE 20

*Di-undecoxypropyl disodium sulfosuccinamate*

41 g. of di-undecoxypropyl amine was added slowly with stirring to 9.8 g. of maleic anhydride dissolved in 50 ml. of chloroform keeping the temperature below 35° C. After the reaction was complete, the chloroform was evaporated and the residue sulphonated with $Na_2SO_3$ as previously described. 62 g. of a pale yellow wax-like material was obtained upon evaporation of the solvent. This product dissolved easily in water to give a clear, strongly foaming solution having a pH of 7.5. This material had excellent sudsing properties both as regards volume of foam and foam stability and also possessed very good detergent properties.

EXAMPLE 21

*N-di(tetradecoxypropyl) disodium sulphosuccinamate*

20 g. of a crude secondary tetradecoxypropyl amine was stirred with 4.25 g. of maleic anhydride at 65° C. and then sulphonated by heating for 1½ hours with 5.65 g. of $Na_2SO_3$ in 50 ml. of hot water. After drying, 28 g. of a light brown, waxy solid was obtained which was soluble in water giving turbid foaming solutions having a pH of 7.0.

EXAMPLE 22

*N-dodecylaminopropyl disodium sulphosuccinamate*

32 g. of dodecylaminopropyl amine, $C_{12}H_{25}NHCH_2CH_2CH_2NH_2$, was dissolved in 50 ml. of chloroform and added to a solution of 9.8 g. of maleic anhydride dissolved in 25 ml. of chloroform keeping the temperature below 55° C. by cooling. This solution was added to 50 ml. of water containing 11 g. of $NaHSO_3$. An emulsion was formed which rapidly converted to a clear jelly upon stirring. After one hour on a steam bath, the sulphonation was practically complete and the chloroform removed by evaporation. The evaporation of the water yielded 52 g. of a pale yellow soap-like solid, soluble in water to give turbid solutions. The product had a slightly acrid odor and a bitter taste.

EXAMPLE 23

*N-hexadecyl disodium sulphosuccinamate*

132 g. of 91.3% primary hexadecyl amine was added slowly to 50 g. of maleic anhydride and 60 cc. of tertiary butanol as solvent at 30° C. After the initial reaction was over the mixture was held at 95° C. for one-half hour to insure complete reaction. The solution of N-hexadecyl maleiamic acid was then stirred into 400 ml. of hot water containing 65 g. of $Na_2SO_3$. This mixture was kept on a steam bath for one hour before evaporating the solvents to obtain 250 g. of a white soap-like solid having a soapy odor and a slightly salty-soapy taste. It was readily soluble in hot water and in solutions of 0.1% formed copious and stable suds. It also had excellent dispersing properties.

Example 24

N-di-n-octyl disodium sulphosuccinamate 132 g. of di-n-octyl amine was added slowly with stirring to 50 g. of maleic anhydride at 30° C. The temperature rose to 80° C. and was held there by regulating the addition of amine. The molten amide was added to 65 g. of Na₂SO₃ dissolved in hot water and the mixture kept on a steam bath for one hour before evaporating the water. On drying, 247 g. of a yellow, resinous wax was obtained which was soluble in water to give perfectly clear solutions having a pH of 6.5. Aqueous solutions of the compound had very good wetting power.

Example 25

N-di-2-ethylhexyl disodium sulphosuccinamate 158 g. of di-2-ethylhexyl amine (76%) was added slowly with stirring to 50 g. of maleic anhydride at 30° C. The temperature was maintained at 75° C. for one-half hour by regulating the addition of the amine. The maleiamic acid was then poured into 500 ml. of hot water containing 65 g. of Na₂SO₃ and 10 ml. of ethyl alcohol and the mixture kept at 90° C. for 1½ hours before evaporating the solvents. On drying, a yellow-brown, resinous, waxy solid was obtained which had a clean, soapy odor and a slightly bitter taste. Its wetting power was very good but 0.1% solution at 30° C. failed to give any substantial volume of foam.

Example 26

N-1-methylhexoxypropyl disodium sulphosuccinamate 32 g. of primary 1-methylhexoxypropyl amine (81.5%) was slowly stirred into 15 g. of maleic anhydride at 28° C. The temperature rose to 80° C. and was held between 80 and 85° C. by carefully controlling the addition of amine. When the reaction was complete, the molten amide was poured into 150 ml. of hot water containing 20 g. of Na₂SO₃ and the mixture kept on the steam bath for 1½ hours before evaporating the water. 67 g. of a hard, white solid was obtained which was ground to a fine white powder and then extracted with ethyl alcohol. The purified product was somewhat hygroscopic and dissolved readily in water to give clear solutions having a pH of 7.5. This compound had very good dispersing power and excellent calcium tolerance, being better in this respect than any of the products described thus far. 0.1% aqueous solutions of the compound had no foaming power whatever at 30° C.

Example 27

1-methyl-4-ethylhexoxypropyl disodium sulphosuccinamate 49 g. of 86% primary 1-methyl-4-ethylhexoxypropyl amine was added slowly to 21 g. of maleic anhydride, keeping the temperature at 85° C. The amide was then poured into 150 ml. of hot water containing 27 g. of dissolved Na₂SO₃ and 10 ml. of alcohol. After one hour at 90° C. the solvents were evaporated to yield 97 g. of a hard, white solid which was ground to a fine powder and extracted with ethyl alcohol. Aqueous solutions of the compound displayed very good dispersing power and had an excellent calcium tolerance, but showed very poor foaming properties at 30° C.

Example 28

N-1-isobutyl-3-methyl-butoxypropyl disodium sulphosuccinamate 48 g. of a crude sample of N-1-isobutyl-3-methylbutoxypropyl amine was slowly added to 19 g. of maleic anhydride while keeping the temperature at about 85° C. The maleiamic acid derivative was then dissolved in 150 ml. of hot water containing 24 g. of Na₂SO₃ and the mixture kept at 90° C. for one-half hour before evaporating the water. 90 g. of a cream colored waxy solid was obtained which was washed with ethyl alcohol to further purify it. Aqueous solutions of this compound had excellent calcium tolerance and very good dispersing power but developed only very slight foam when shaken.

Example 29

N-1-(3-ethylamyl)-4-ethyloctoxypropyl disodium sulphosuccinamate 23 g. of a 66% pure heptadecoxypropyl amine having the formula

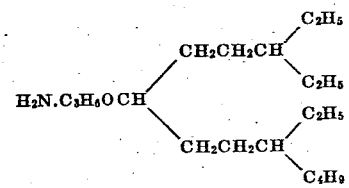

was slowly added to 5 g. of maleic anhydride at 85° C. The resulting maleiamic acid was poured into 75 ml. of hot water containing 6.5 g. of dissolved Na₂SO₃ and 10 ml. of ethyl alcohol. After one hour on the steam bath the solvents were evaporated and 35 g. of a soft, sticky, yellow-brown semi-solid was obtained. It was purified by repeated extractions with ethyl alcohol, giving a pale yellow waxy solid which gave almost perfectly clear solutions in water. This compound was an excellent dispersing agent and had good wetting power.

Example 30

Mixed mono and di-2-ethylhexoxypropyl disodium sulphosuccinamate 135 g. of mixed 2-ethyl-hexoxypropyl amine, obtained by the hydrogenation of 2-ethyl hexoxypropyl nitrile and containing approximately 41.4% of 2-ethylhexoxypropyl amine and 47.1% of di-2-ethylhexoxypropyl amine was added slowly to 50 g. of maleic anhydride at a temperature of 70° C. The molten amides were then dissolved in 400 ml. of hot water containing 65 g. of Na₂SO₃ and 10 ml. of alcohol. Sulphonation was completed by keeping the mixture at 90° C. for 1½ hours. Evaporation of solvents yielded 40 g. of pale yellow, somewhat resinous wax, soluble in water to give very slightly turbid solutions having a pH of 8.0. This compound had good wetting properties.

Example 31

N-di-1-methylhexoxypropyl disodium sulphosuccinamate 69 g. of di-1-methylhexoxypropyl amine was added slowly to 21 g. of maleic anhydride at 75° C. to form the maleiamic acid derivative. This was dissolved in 200 ml. of hot water containing 28 g. of Na₂SO₃ and 10 ml. of alcohol. This mixture was kept at 90° C. for 1½ hours before evaporating the solvents to give 115 g. of a yellow waxy solid. This compound had very good calcium tolerance and good wetting and dispersing properties.

EXAMPLE 32

N-di-(1-methyl-4-ethylhexoxypropyl) disodium sulphosuccinamate

76 g. of di-1-methyl-4-ethylhexoxypropyl amine was added slowly to 22 g. of maleic anhydride, keeping the temperature around 75° C. The product was then stirred into 200 ml. of hot water containing 28.5 g. of dissolved $Na_2SO_3$ and 25 ml. of alcohol. After one hour on the steam bath the solvents were evaporated and 130 g. of a yellow, waxy solid was obtained. This crude product was washed with alcohol and the residue dried to yield 100 g. of a cream colored solid which was easily ground into a fine powder. Aqueous solutions of this compound had very good wetting and dispersing properties and when shaken gave copious suds.

EXAMPLE 33

N-di-(1-isobutyl-3-methylbutoxypropyl) disodium sulphosuccinamate

27 g. of di-1-isobutyl-3-methylbutoxypropyl amine having the formula

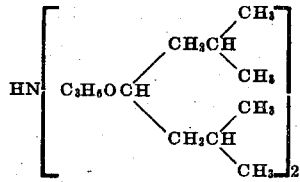

was added to 7½ g. of maleic anhydride at 65° C. The product was then dissolved in 75 ml. of hot water containing 9½ g. of $Na_2SO_3$. After heating on a steam bath for one-half hour, the water was evaporated to yield 44 g. of a pale yellow, brittle wax which was soluble in water to give very slightly turbid solutions having a pH of 6.5. Subsequent purification of the product by extraction with alcohol gave a white material soluble in water to give clear solutions. It had an odor faintly resembling vanilla and a slightly bitter taste. Aqueous solutions of this compound displayed excellent wetting power and good dispersing properties.

EXAMPLE 34

26 g. (⅛ mole) aconitic anhydride was added to 46 g. (⅙ mole) of primary octadecylamine and the mixture heated to 120° C. until uniform. 6.7 g. (⅙ mole) NaOH and 21.7 g. (⅙ mole+2% excess) of $Na_2SO_3$ were dissolved in 300 ml. of water and the solution heated to about 80° C. The amide was poured into this solution and 50 ml. alcohol added to keep the mixture fluid and uniform. A clear gelatinous brown solution was obtained which was heated on a steam bath at 80° C. and then evaporated to dryness to yield 89 g. of a dark brown solid. This product was purified by washing with two 150 cc. portions of hot ethyl alcohol in which the product was insoluble. The filtered residue was dried to recover a light tan solid which was easily soluble in water to give clear foaming solutions. This compound was an excellent sudsing agent and had good detergent properties. It also displayed an unusually high calcium tolerance and was particularly valuable in combination with soap in acid solutions and hard water.

The various arts in which the compounds of the invention may be used commercially are widely diversified. In general, however, these compounds may be employed for the following uses among others:

1. Wetting or surface tension reducing agents.
2. Detergents.
3. Emulsifiers or dispersing agents.
4. Demulsifiers.
5. Lubricants.
6. Dye assistants.
7. Ore dressing.
8. As aids in chemical reactions.

1. *Wetting agents.*—When employed for this purpose the compounds may be used alone or in admixture with solvents, solubilizing agents or assistants such as aliphatic alcohols of 6 or more carbon atoms, urea, butyl ether of ethylene glycol, isopropyl alcohol, inorganic salts such as sodium sulphate and the like. In these forms they may be used as softening, wetting, penetrating and carbonizing agents in the treatment of textiles such as cotton, cotton raw stock, wool, silk, cellulose esters and ethers, synthetic wool, synthetic silk (nylon), down, feathers and the like; as addition agents to mercerizing baths, flax retting baths, starch ferments for removing sizing, starch size preparations for warp sizing during weaving of cotton and cellulose ester fabrics, bleaching liquors, stripping liquors, fulling liquors, and carroting liquors for the treatment of furs and felt. They may also be added to electroplating baths, to the electrolyte used in storage batteries or to reduce entrainment in electrolytic cells for the generation of hydrogen and oxygen or chlorine.

The compounds may also be applied in the leather industry for wetting out, softening or soaking hides, as aids in deliming, bating with proteolytic enzymes, tanning and dyeing as well as in fatliquoring and stuffing preparations. Other fields wherein their wetting and surface tension reducing properties are of value include disinfectants, e. g. in admixture with boric acid for preventing mold and fungus diseases in citrus fruits; in admixture with mercury, zinc, cadmium, or bismuth salts in the treatment of dandruff, athlete's foot, ringworm, exzema, mange and similar infections; in admixture with mercurochrome or iodine as household disinfectants; in insecticides such as mixtures with Paris green, Bordeaux mixture, nitrophenols and the like; in the paper industry as for example as penetrants in paper pulp digesters for cooking wood chips with calcium bisulphite, sodium sulfate, sodium sulfide and other fiber liberating liquors; in similar treatment of waste rags, newsprint and other paper stock; in improving the absorbency of paper towels; in deinking paper; in bleaching ground wood pulp; as addition agents to the Jordan engine or head boxes of Fourdrinier paper machines; in washing paper mill felts and the like. Other miscellaneous fields are contraceptive preparations, the impregnation of sterile bandages and dressings, as surface tension reducing agents in creosote mixtures for coating logs, as gloss improvers for addition to paints and varnishes and the like, as penetrants for impregnating substrates such as kieselguhr, blanc fixe, abrasives such as silica and alumina and the like before mixing or coating with oils, paints, synthetic resins, tars and other binders, and as anti-spattering agents for addition to oleomargarine and similar fats and fatty acids.

Another important field of utility for the compounds of the present invention is their addition to organic compounds to lower the surface tension thereof. This is of particular value in the vaporization of compounds which decompose or polymerize at or near their boiling points. In the purification of many of these compounds, such as oleic, ricinoleic, and stearic acids, abietic acid and their esters, naphthalene, anthracene, anthraquinone, phthalic anhydride, esters of dicarboxylic acids such as diamyl, dihexyl and dioctyl maleate and fumarate, tributyl and triamyl adipate, citrate and the like by flash distillation or by sublimation with air, steam or other gases the incorporation of small amounts of the wetting agents of the invention is of advantage.

Still another important field in which the monoamides of the invention may be used is in photography. They may be added to photographic developers containing metol, to fixing solutions, toning solutions, blueprint solutions containing ferricyanides and ferric ammonium oxalate and the like. They may also be used as solutions in water or organic solvents for the pretreatment of sensitized or exposed films before developing.

Other miscellaneous uses for the wetting agents are in fire extinguishing mixtures to promote the water saturation of fabrics or other combustible material that may be burning or in danger of ignition; as foaming agents in foam-type fire extinguishers; as additions to aqueous salt solutions for spraying coal and settling dust in grain elevators, flour mills and on roads; as additions to fluxing salts such as salammoniac in galvanizing fluxes, either alone or in admixture with saponin, licorice root, tannin, sugars, etc.; and as addition agents to pencil leads. They may also be used to promote the humidifying action of water used in watering plants, in preserving green fodder, in humidifying dwellings, factories and theatres as a part of the air washing and air conditioning system; and in reducing the internal resistance or skin friction in hydraulic appliances such as hydraulic drives, power transmission devices and the like.

2. *Detergents.*—The property of detergency in a compound is dependent on the presence of at least one hydrophobic group of considerable length in combination with one or more groups of a hydrophilic character. For this reason the monoamides formed with aliphatic chains of 8 to 20 carbon atoms are of especial importance as detergents, although the invention is by no means limited to this class. On the contrary, any of the monoamides described above may be used in the preparation of detergent compositions whenever their properties are found to be suitable for the purpose in mind.

The compounds of the present invention are well suited for compositions requiring a mild detergent action such as tooth pastes, tooth powders, liquid dentifrices, shampoos and the like. For these purposes, as well as in the preparation of household cleaners, silver polishes, mechanics' hand soaps and similar mixtures exhibiting stronger detergency, they may be mixed with soap, magnesia, chalk, pumice, wood flour, seismotite, and other mild abrasives, while for household use there may be added pine oil, sodium, potassium or ammonium tetraphosphate or hexametaphosphate, tetrasodium or tetrapotassium pyrophosphate, sodium sulphate, sodium silicate and the like. When used for scouring vegetable and animal fibers for the removal of fatty or oily materials or in removing arsenic, lead, fluorine and other spray residues from apples there may be added hydrochloric or sulfuric acid or alkalies. The compounds may also be used as glass cleaners, preferably in admixture with alcohols, acetone or other volatile solvents, as wall paper removers and in the preparation of shoe cleaners for white shoes, preferably in admixture with ground calcium carbonate, lithopone, zinc oxide, titanium dioxide, diatomaceous earths, clays and other pigments, fillers and extenders.

The detergent properties of the compounds of the invention may be improved by applying them in admixture with aliphatic alcohols of 8 or more carbon atoms, or with free fatty acids such as oleic, stearic, palmitic or ricinoleic, or with mixtures containing acids such as refined talloel, which consists essentially of a mixture of abietic acid and mixed fatty acids including stearic, oleic, and ricinoleic or mixed fatty acids from the hydrolysis of fats, vegetable or animal oils, etc.

3. *Emulsifiers or dispersing agents.*—When used for these purposes the compounds of the invention may be used alone or in admixture with glue, gum tragacanth, gum arabic, locust bean gum, methyl or ethyl cellulose and other emulsion stabilizers as well as in conjunction with other known emulsifying agents such as sulfonated vegetable and mineral oils, sodium caseinate, saponified rosin, sulphonated mixtures containing waxes, sulphonated tallow and the like.

In these forms they may be used for such diversified purposes as the preparation of pigment and dye emulsions such as those used for coloring fruit; for printing inks and printing pastes for textiles in conjunction with ultramarine, color lakes, vat dyes and other coloring materials and solutions or dispersions of alkyd resins, urea-formaldehyde resins, phenol-formaldehyde resins and the like; for emulsifying waxes and preparing self-emulsifying waxes as in the preparation of leather dressings or finishes, floor polishes, furniture polishes, metal polishes or cleaners and for wax sizes for paper and textiles containing carnauba wax, montan wax, beeswax, paraffin, ozokerite, candelilla wax, etc.; for emulsifying rosin or sodium resinates as in the preparation of high free rosin size emulsions; for emulsifying casein, for emulsifying mineral oils in preparing the so-called "soluble oils" for treating textiles; for emulsifying vegetable fats and oils as in the preparation of mayonnaise, cold creams, lipsticks, rouge and other cosmetics; for emulsifying neat's-foot oil, moellon degras, dibutyl phthalate or other natural or synthetic oils used for fatliquoring leather; for insecticidal emulsions such as emulsions of mineral oil, pyrethrum and water; for pharmaceutical emulsions such as petrolagar and cod liver oil emulsions; for oil emulsions of the oil-in-water type such as drilling oils, cutting oils, terpene emulsions; for emulsified germicides and as dispersing agents in the preparation of color lakes.

Other fields of application of the monoamides of the invention include the preparation of asphalt and creosote emulsions for waterproofing concrete and masonry, for covering wet concrete during its setting, for use as road binders, for impregnating or treating shingles of wood, felt, asbestos and other fibrous material, for coating Kraft paper in the preparation of roofings and insulating paper for houses, for impregnating fiber board, pressed wood and other building compositions and for coating and waterproofing gypsum and other set cementitious material.

They may also be used in amounts of 2-5% by weight in the preparation and preservation of latex solutions and emulsions to be used as adhesives either alone or in admixture with sodium caseinate, starches and the like.

The sulphopolycarboxylic monoamides may also be used as dispersing agents in concrete mixes, whereby the fluidity is improved and the amount of water necessary for neat concrete is reduced; in oil well drilling muds containing bentonite and other colloidal clays with or without iron oxide or barytes or other weighting agent, whereby the fluidity and wall-building properties of the mixture are improved; in the preparation of waterproofing agents for fabrics or other purposes containing aluminum oleate, aluminum formate-acetate, rosin soaps, potassium sulphonaphthenate and similar colloids; in the preparation of oils and greases such as colloidally dispersed carbon, extreme pressure lubricants containing chlorinated fatty acids and the like.

Other uses where their dispersing properties are of value as interface modifiers to reduce viscosity in the preparation of chocolate mixes used as coatings for cakes, candies and other confections. For this purpose 0.3 to 3% of the wetting agent may be included in the fat, oil, cocoa butter used in the mix. These amounts may also be included in cooking fats such as lard, hydrogenated cottonseed oil, coconut oil and the like to render them non-spattering and more stable against rancidity.

4. *Demulsifiers.*—Any of the sulphopolycarboxylic acid monoamides or their sodium, potassium, ammonium, ethanolamine, alkaline earth metal or heavy metal salts may be used for the resolution of emulsions of the water-in-oil type such as crude petroleum emulsions, bottom settlings from crude or refined oil storage tanks, emulsions resulting from the washing of oils with water, salt solutions, treating solutions and the like, emulsions obtained from hydraulic mining or "flooding" of oil fields, emulsions obtained upon washing other hydrocarbons with water or aqueous solutions of calcium hydroxide, neutral salt solutions, etc. including emulsions containing turpentine, alpha and beta pinene, limonene, coal tar distillates and the like. For these purposes, and particularly for breaking crude oil field emulsions, any sulphopolycarboxylic acid monoamide may be used, preferably in ratios of 1:100 to 1:20,000 based on the crude oil emulsion being treated.

The compounds of my invention may be used as the sole treating agent, preferably in solution in water or in other solvents or demulsifying assistants such as phenols, cresols, aliphatic or aromatic hydrocarbons such as disodium phosphate solutions, tetrasodium pyrophosphate solutions, sodium or potassium hexametaphosphate solutions and the like. They may also be used in conjunction with, or in admixture with, other wetting and demulsifying agents such as mono- or polyalkyl, aryl or hydro-aryl naphthalene mono- or polysulphonic acids and their salts and condensation products with higher aliphatic or cycloaliphatic substituted or unsubstituted amines, amides or ketones, or with aldehydes such as formaldehyde, or with polyhydric alcohols, or with higher unsaturated or hydroxy fatty acids or their salts, esters or amides.

Another class of compounds that can be used for this purpose, either singly or in admixture, together with the sulphopolycarboxylic monoamides of the present invention are those derived from the higher fatty acids such as oleic acid, ricinoleic acid, stearic acid, palmitic acid, lauric acid, the corresponding keto- and polyketo- acids, and the corresponding alcohols. The soaps, lactones, lactides, lactams and polymers of these acids and their glycerides, glycol esters, monohydric alcohol esters and phenol esters such as those obtained by condensing with betanaphthol either in sulphonated or unsulphonated form can be used for this purpose as well as the products obtained by further condensing any of these substances with starch, proteins, mono- or polynuclear organic compounds such as hydrocarbons, phenols, tar acid oils and the like, preferably in the presence of strong sulphuric acid or formaldehyde or alkylene oxides.

5. *Lubricants.*—By reason of their colloidal character the monoamides of the invention are well suited for use as lubricants for textiles including cotton, wool, silk, rayon and other natural and artificial filaments and woven or knitted fabrics, and also for leather lubrication. For these and similar purposes they may be used alone or in admixture with starches, gums, mineral or vegetable oils and synthetic resins, particularly oil modified alkyd and phenol-aldehyde resins of the long oil type. They may also be used in admixture with urea-formaldehyde resins, higher alkyl amines, condensation products of pyridine with higher alkyl amines and similar substances for glazine, creaseproofing and waterproofing threads and fabrics. Other uses in which their lubricating properties are of value are the lubrication of molds in molding rubber, synthetic resins, etc.; as plasticizers for addition to molding compositions containing abrasive fillers during molding by extrusion or in automatic pelleting machines, etc.

6. *Dye assistants.*—The compounds of the invention are resistant to hard water and are therefore well suited as addition agents to dye baths for the purpose of obtaining more level dyeings. They may also be used in the soaping or after-treatment of dyed fabrics and also as colloidizing agents in the printing, padding and dyeing of textile fibers, e. g. in solutions containing such dyes as Naphthol A. S. for application to textiles by the padding process; as assistants in dyeing cellulose acetate with dispersed insoluble dyestuffs; as penetrating agents in the mordanting of textiles; as wetting agents in reducing baths containing vat dyes and in baths for the lustering or delustering of acetate silk. They may be used in printing with aniline black; in dyeing with developed dyes; in dyeing animal fibers with vat dyes and in the production of pigments containing azo dyes, basic or acid vat dyes, or sulphur dyes in finely divided conditions. A representative printing paste in which they may be used is one containing a stabilized diazo compound and a coupling component admixed with gums or other thickeners, organic bases or other alkalies, and solvents.

7. *Ore dressing.*—In this field the surface active agents of the present invention may be used for a wide variety of purposes. They may be added to froth flotation machines to aid in the separation of silica from ores having a high free silica content. They may be used as wetting agents in the cyanidation of ores as well as in amalgamation of auriferous materials. They may be employed as aids in gravity separation methods, in bulk oil flotation and in tabling operations. They may also be used in jigging and in mining operations, such as the recovery of fixed oil from oil sands. They may be added to the water used in hydraulic mining operations, in order to promote penetration. Finally they may be used in the form of aqueous solutions as sprays for fume arresters in smelters, grinding operations and the like, whereby an improved wetting and precipitation of the fume and dust is obtained.

8. *Chemical reactions.*—Wetting is a preliminary condition to chemical reaction, particularly when the reaction is to take place between two different phases. Thus in reactions between two non-miscible phases, such as an aqueous solution and an organic liquid, the presence of a wetting agent enables interaction to take place more readily by lowering the interfacial tension between the liquid layers. The same is true in reactions involving the treatment of a solid with a liquid reagent, such as the leaching of copper ores with sulphuric acid.

Typical reactions in which the surface active agents of the present invention may be employed are therefore (*a*) Hydrolysis, such as the hydrolysis of starch, sugars, fats, glyceride oils, etc. in conjunction with such agents as enzymes, steam, Twitchell's reagent, acids, alkalies and the like; the hydrolysis of olefin sulphates to secondary alcohols; the saponification of cellulose acetate threads and filaments with aqueous saponifying agents such as sodium silicate, etc.

(*b*) Hydration, such as the slaking of lime, the decomposition of magnesium alkyl halides (Grignard reagent) the setting of hydraulic cement, plaster, calcium sulphate plasters, Keene's cement, etc.

(*c*) Leaching and extracting, such as the extraction of sugar from sugar beets, the extracting of vanilla, oil of peppermint and other essential oils, with or without the use of steam by the use of water or organic solvents; the extraction of perfumes from flower petals or other sources with the aid of fats, organic solvents, etc.; the leaching of trona and other ores containing borax, sodium nitrate and similar water-soluble constituents; the regeneration of water-softening zeolites for the removal of calcium, magnesium, etc. by percolation with sodium chloride solutions containing the wetting agent; the regeneration of organic gels used for water softening; the extraction of residues from manufacturing processes such as the extraction of phthalic acid from distillation residues; in purification processes such as the purification of rosin by treatment with hydrocarbon solvents; for increasing the speed of solution of reagents in water or organic solvents as in dissolving maleic or succinic acids in water for clarification and recrystallization; dissolving resins and gums in benzol, toluol, linseed oil and the like in the manufacture of varnishes.

(*d*) Treatment of metals and salts with acids and alkalies, as in the generation of hydrogen from zinc and hydrochloric or sulphuric acids; the generation of carbon dioxide from calcium carbonate and acids, the cleaning of marble buildings and statuary with acids and the like including reductions by the addition of zinc dust to acid or alkaline solutions. The wetting agents may also be employed in selective metal treating processes such as the removal of oxide scale from iron, steel and other metals and alloys, and in wetting metal surfaces as in cleaning steel automobile bodies with phosphoric acid or for rustproofing steel with metal phosphate-phosphoric acid solutions.

(*e*) Chemical reactions generally such as esterifications, sulphonations, chlorinations, diazotizations, coupling reactions, addition reactions, reducing reactions, etc. For example, the sulphonation of esters of unsaturated aliphatic di- and polycarboxylic acids by the addition of aqueous sodium sulfite or sodium bisulfite solutions may be effected in a shorter time by the addition of one of the surface active agents of the present invention and these esters may also be formed in the presence of small amounts of the wetting agent. Similarly, in the reduction of nitro-compounds such as nitrobenzenes to aniline and its homologs by the action of solid reducing agents such as metallic iron and zinc together with free acids or alkalies, the presence of one of the wetting agents of the invention will promote the rate of reaction.

What we claim is:

1. Compounds having the general formula

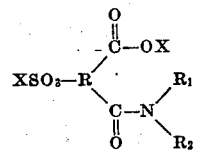

in which R is the residue of an aliphatic polycarboxylic acid, $R_1$ is a member of the group consisting of hydrogen, alkyl, and alkoxyalkyl radicals, $R_2$ is an alkoxyalkyl radical, and X is a member of the group consisting of hydrogen and salt-forming radicals.

2. Compounds having the general formula

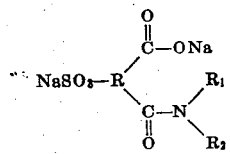

in which R is the residue of an aliphatic carboxylic acid, $R_1$ is a member of the group consisting of hydrogen, alkyl, and alkoxyalkyl radicals and $R_2$ is an alkoxyalkyl radical.

3. Compounds having the general formula

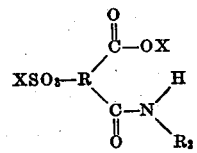

in which R is the residue of an aliphatic polycarboxylic acid, $R_2$ is an alkyloxyalkyl radical and X is a member of the group consisting of hydrogen and salt-forming radicals.

4. Compounds having the general formula

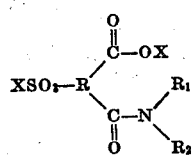

in which R is the residue of an aliphatic polycarboxylic acid, $R_1$ is an alkoxyalkyl radical, $R_2$ is an alkoxyalkyl radical and X is a member of the group consisting of hydrogen and salt-forming radicals.

5. Compounds having the general formula

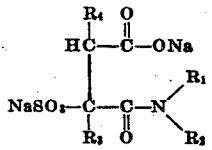

in which $R_1$ is a member of the group consisting of hydrogen, alkyl, and alkoxyalkyl radicals, $R_2$ is an alkoxyalkyl radical and $R_3$ and $R_4$ are members of the group consisting of hydrogen, alkyl and aryl radicals.

6. Compounds of the general formula

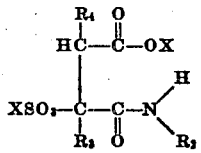

in which $R_2$ is an alkyloxayalkyl radical, $R_3$ and $R_4$ are members of the group consisting of hydrogen, alkyl and aryl radicals and X is a member of the group consisting of hydrogen and salt-forming radicals.

7. Compounds of the general formula

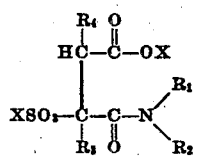

in which $R_1$ is an alkoxyalkyl radical, $R_2$ is an alkyloxyalkyl radical, $R_3$ and $R_4$ are members of the group consisting of hydrogen, alkyl and aryl radicals and X is a member of the group consisting of hydrogen and salt-forming radicals.

8. Compounds of the general formula

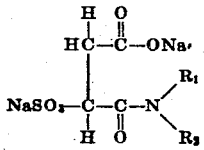

in which $R_1$ is a member of the group consisting of hydrogen, alkyl, and alkoxyalkyl radicals and $R_2$ is an alkoxyalkyl radical.

9. Compounds of the general formula

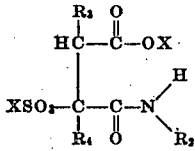

in which $R_2$ is an alkyloxypropyl radical, $R_3$ and $R_4$ are members of the group consisting of hydrogen, alkyl and aryl radicals and X is a member of the group consisting of hydrogen and salt-forming radicals.

10. Compounds of the general formula

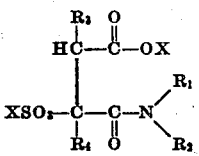

in which $R_1$ and $R_2$ are alkyloxypropyl radicals, $R_3$ and $R_4$ are members of the group consisting of hydrogen, alkyl and aryl radicals and X is a member of the group consisting of hydrogen and salt-forming radicals.

ALPHONS O. JAEGER.
KATHRYN L. LYNCH.